US011899956B2

United States Patent
Koo et al.

(10) Patent No.: US 11,899,956 B2
(45) Date of Patent: Feb. 13, 2024

(54) OPTIMIZED READ-MODIFY-WRITES DURING RELOCATION OF OVERLAPPING LOGICAL BLOCKS

(71) Applicant: Western Digital Technologies, Inc., San Jose, CA (US)

(72) Inventors: Duckhoi Koo, San Jose, CA (US); Kwangyoung Lee, San Jose, CA (US); Kartheek Reddy Daida, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/847,078

(22) Filed: Jun. 22, 2022

(65) Prior Publication Data

US 2023/0418501 A1 Dec. 28, 2023

(51) Int. Cl.
*G06F 3/06* (2006.01)
*G06F 12/02* (2006.01)

(52) U.S. Cl.
CPC ............ *G06F 3/0647* (2013.01); *G06F 3/064* (2013.01); *G06F 3/0607* (2013.01); *G06F 3/0679* (2013.01); *G06F 12/0253* (2013.01); *G06F 2212/7205* (2013.01)

(58) Field of Classification Search
CPC .................................................... G06F 3/0647
See application file for complete search history.

(56) References Cited

U.S. PATENT DOCUMENTS

| 10,235,283 | B2 | 3/2019 | Barzik et al. |
| 11,126,379 | B2 | 9/2021 | Kim |
| 2009/0024808 | A1 | 1/2009 | Hillier, III et al. |
| 2015/0106563 | A1* | 4/2015 | Hsu-Hung .......... G06F 11/1096 711/114 |
| 2019/0146913 | A1* | 5/2019 | Trika .................. G06F 12/0246 711/103 |
| 2021/0209030 | A1 | 7/2021 | Gorrle et al. |
| 2021/0311660 | A1* | 10/2021 | Saxena ................. G06F 3/0659 |

* cited by examiner

*Primary Examiner* — Rocio Del Mar Perez-Velez
*Assistant Examiner* — Marwan Ayash
(74) *Attorney, Agent, or Firm* — Morgan, Lewis & Bockius LLP

(57) ABSTRACT

Disclosed are systems and methods for providing read-modify-writes during relocation of overlapping of logical blocks. A method includes receiving a host write command from a host interface. The method also includes translating a logical block address for the host write command to a physical address on a device memory. The physical address corresponds to a plurality of indirection units. The method also includes, in accordance with a determination that the physical address does not correspond to an aligned address, processing a read-modify-write operation for one or more indirection units of the plurality of indirection units during a relocation, in accordance with a determination that a relocation block has an overlapping indirection unit with the one or more indirection units.

15 Claims, 5 Drawing Sheets

OPTIMIZED READ-MODIFY-WRITES DURING RELOCATION OF OVERLAPPING LOGICAL BLOCKS

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information. Increases in storage density have been facilitated in various ways, including increasing the density of memory cells on a chip enabled by manufacturing developments, and transitioning from single-level flash memory cells to multi-level flash memory cells, so that two or more bits can be stored by each flash memory cell.

Since flash memory can only be programmed and erased a limited number of times, it is important to optimize memory management processes (e.g., garbage collection, wear leveling, caching, etc.) to enhance performance and endurance of memory devices.

The description provided in the background section should not be assumed to be prior art merely because it is mentioned in or associated with the background section. The background section may include information that describes one or more aspects of the subject technology, and the description in this section does not limit the invention.

BRIEF DESCRIPTION OF THE DRAWINGS

A detailed description will be made with reference to the accompanying drawings.

DETAILED DESCRIPTION

Figure 1:
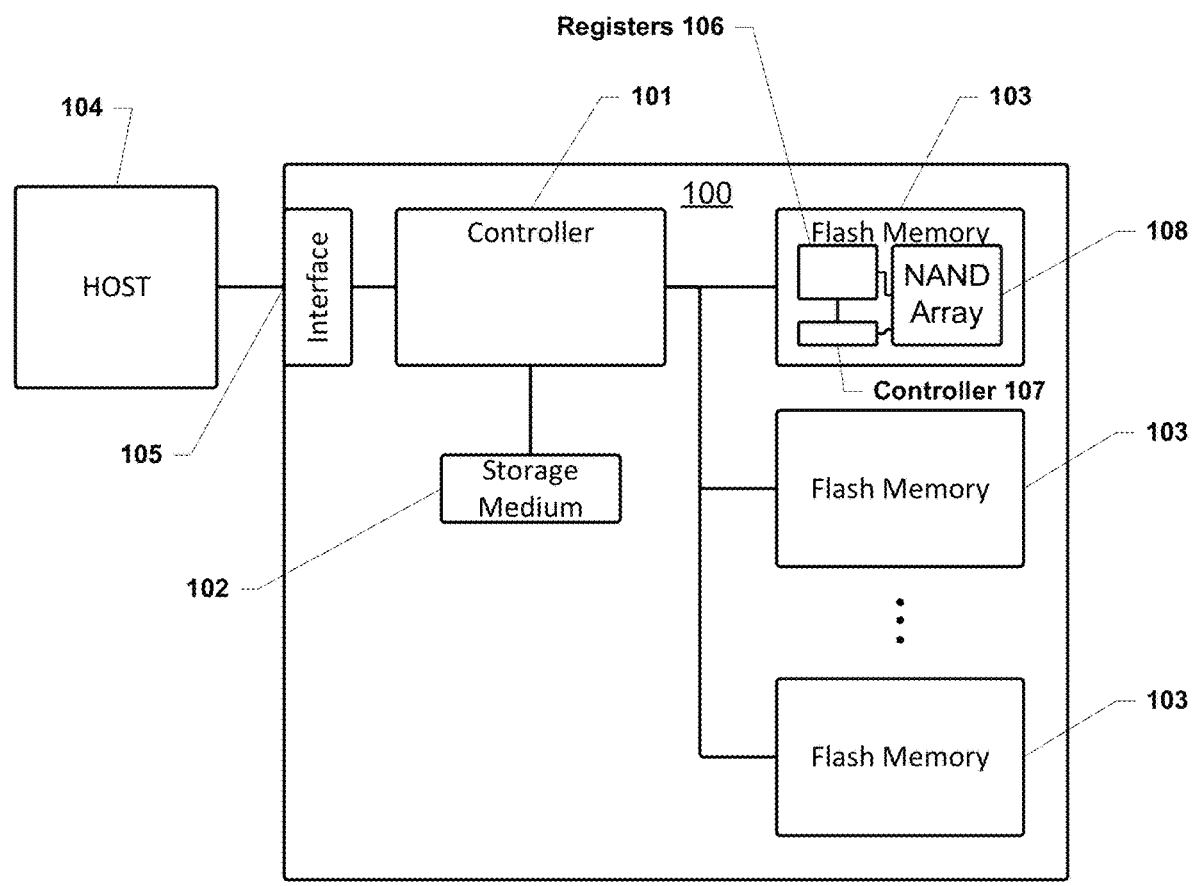
FIG. 1 is a block diagram illustrating components of an example data storage system, according to one or more embodiments.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology may be practiced without these specific details. In some instances, structures and components are shown in block diagram form to avoid obscuring the concepts of the subject technology. Like components are labelled with identical element numbers for ease of understanding.

The present description relates in general to data storage systems and methods, and more particularly to, for example, without limitation, optimizing read-modify-writes during relocation of overlapping logical blocks. As discussed above, it is important to optimize memory management processes (e.g., garbage collection, wear leveling, caching, etc.) to enhance performance and endurance of memory devices. A host (e.g., a host device 104 in FIG. 1) may issue writes commands to a device (e.g., a data storage system 100 in FIG. 1) based on a logical block address (LBA) that typically has a granularity of 512 bytes or 4 kilobytes (KB). On the other hand, the device handles write commands based on indirection units (IUs). IUs have sizes that are much larger than the granularity of the LBA. A size of an IU may be, for example, 16 KB, 32 KB, etc. An indirection unit may be sometimes referred to as an internal mapping unit. Because of the discrepancy in basic mapping unit between the host and the device, unaligned writes from the host may result in read-modify-write (RMW) in the device. For an unaligned write, the device may read an IU (e.g., 16 KB, 32 KB, etc.) and modify the IU with unaligned data from host and then write the updated IU to the flash memory. In some systems, the device checks host writes and performs a RMW if the host write has unaligned data with IU. For random write patterns, many RMWs need to be performed and this causes extra cost including reads and writes in flash during RMW. As the size of IU increases, the extra cost increases as well.

To address at least some of the problems described above and to provide other benefits, a system according to the techniques described herein may handle RMW for host write with unaligned data during relocation (e.g., garbage collection (GC), read-scrub (RS), and wear leveling), if a relocation source block has the same IU with host writes. Relocation causes internal operations including read and write to make free space or move valid data to a new block. Garbage collection is typically performed whenever there is no free space. GC may select a source block (or a victim block) that has the least valid data and migrate the valid data from a source block to a new block. RS may be performed whenever unstable data is detected. Valid data of the block with unstable data may be migrated to a new block. RMW may cause extra cost including read and write based on IU granularity, similar to relocation.

FIG. 1 is a block diagram illustrating components of an example data storage system, according to aspects of the subject technology. As depicted in FIG. 1, in some aspects, a data storage system 100 (e.g., a solid state drive (SSD)) includes a data storage controller 101, a storage medium 102, and a flash memory array including one or more flash memory 103. The controller 101 may use the storage medium 102 for temporary storage of data and information used to manage the data storage system 100. The controller 101 may include several internal components (not shown), such as a read-only memory, other types of memory, a flash component interface (e.g., a multiplexer to manage instruction and data transport along a serial connection to the flash memory 103), an input/output (I/O) interface, error correction circuitry, and the like. In some aspects, all of these elements of the controller 101 may be integrated into a single chip. In other aspects, these elements may be separated on their own personal computer (PC) board.

In some implementations, aspects of the subject disclosure may be implemented in the data storage system 100.

For example, aspects of the subject disclosure may be integrated with the function of the data storage controller 101 or may be implemented as separate components for use in conjunction with the data storage controller 101.

The controller 101 may also include a processor that may be configured to execute code or instructions to perform the operations and functionality described herein, manage request flow and address mappings, and to perform calculations and generate commands. The processor of the controller 101 may be configured to monitor and/or control the operation of the components in the data storage controller 101. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on read-only-memory (ROM) within the controller 101 and/or its processor. One or more sequences of instructions may be software stored and read from the storage medium 102, the flash memory 103, or received from a host device 104 (e.g., via a host interface 105). ROM, the storage medium 102, the flash memory 103, represent examples of machine or computer readable media on which instructions/code executable by the controller 101 and/or its processor may be stored. Machine or computer readable media may generally refer to any medium or media used to provide instructions to the controller 101 and/or its processor, including volatile media, such as dynamic memory used for the storage media 102 or for buffers within the controller 101, and non-volatile media, such as electronic media, optical media, and magnetic media.

In some aspects, the controller 101 may be configured to store data received from the host device 104 in the flash memory 103 in response to a write command from the host device 104. The controller 101 is further configured to read data stored in the flash memory 103 and to transfer the read data to the host device 104 in response to a read command from the host device 104. A host device 104 may be sometimes referred to as a host or a host system.

The host device 104 represents any device configured to be coupled to the data storage system 100 and to store data in the data storage system 100. The host device 104 may be a computing system such as a personal computer, a server, a workstation, a laptop computer, a personal digital assistant (PDA), a smart phone, or the like. Alternatively, the host device 104 may be an electronic device such as a digital camera, a digital audio player, a digital video recorder, or the like.

In some aspects, the storage medium 102 represents volatile memory used to temporarily store data and information used to manage the data storage system 100. According to aspects of the subject technology, the storage medium 102 is random access memory (RAM), such as double data rate (DDR) RAM. Other types of RAM may be also used to implement the storage medium 102. The memory 102 may be implemented using a single RAM module or multiple RAM modules. While the storage medium 102 is depicted as being distinct from the controller 101, those skilled in the art will recognize that the storage medium 102 may be incorporated into the controller 101 without departing from the scope of the subject technology. Alternatively, the storage medium 102 may be a non-volatile memory, such as a magnetic disk, flash memory, peripheral SSD, and the like.

As further depicted in FIG. 1, the data storage system 100 may also include the host interface 105. The host interface 105 may be configured to be operably coupled (e.g., by wired or wireless connection) to the host device 104, to receive data from the host device 104 and to send data to the host device 104. The host interface 105 may include electrical and physical connections, or a wireless connection, for operably coupling the host device 104 to the controller 101 (e.g., via the I/O interface of the controller 101). The host interface 105 may be configured to communicate data, addresses, and control signals between the host device 104 and the controller 101. Alternatively, the I/O interface of the controller 101 may include and/or be combined with the host interface 105. The host interface 105 may be configured to implement a standard interface, such as a small computer system interface (SCSI), a serial-attached SCSI (SAS), a fiber channel interface, a peripheral component interconnect express (PCIe), a serial advanced technology attachment (SATA), a universal serial bus (USB), or the like. The host interface 105 may be configured to implement only one interface. Alternatively, the host interface 105 (and/or the I/O interface of controller 101) may be configured to implement multiple interfaces, which may be individually selectable using a configuration parameter selected by a user or programmed at the time of assembly. The host interface 105 may include one or more buffers for buffering transmissions between the host device 104 and the controller 101.

The flash memory 103 may represent a non-volatile memory device for storing data. According to aspects of the subject technology, the flash memory 103 includes, for example, a NAND flash memory. The flash memory 503 may include a single flash memory device or chip, or (as depicted in FIG. 1) may include multiple flash memory devices or chips arranged in multiple channels. The flash memory 103 is not limited to any particular capacity or configuration. For example, the number of physical blocks, the number of physical pages per physical block, the number of sectors per physical page, and the size of the sectors may vary within the scope of the subject technology.

The flash memory may have a standard interface specification so that chips from multiple manufacturers can be used interchangeably (at least to a large degree). The interface hides the inner working of the flash and returns only internally detected bit values for data. In aspects, the interface of the flash memory 103 is used to access one or more internal registers 106 and an internal flash controller 107 for communication by external devices (e.g., the controller 101). In some aspects, the registers 106 may include address, command, and/or data registers, which internally retrieve and output the necessary data to and from a NAND memory cell array 108. A NAND memory cell array 108 may be sometimes referred to as a NAND array, a memory array, or a NAND. For example, a data register may include data to be stored in the memory array 108, or data after a fetch from the memory array 108 and may also be used for temporary data storage and/or act like a buffer. An address register may store the memory address from which data will be fetched to the host device 104 or the address to which data will be sent and stored. In some aspects, a command register is included to control parity, interrupt control, and the like. In some aspects, the internal flash controller 107 is accessible via a control register to control the general behavior of the flash memory 103. The internal flash controller 107 and/or the control register may control the number of stop bits, word length, receiver clock source, and may also control switching the addressing mode, paging control, coprocessor control, and the like.

In some aspects, the registers 106 may also include a test register. The test register may be accessed by specific addresses and/or data combinations provided at the interface of flash memory 103 (e.g., by specialized software provided by the manufacturer to perform various tests on the internal components of the flash memory). In further aspects, the test register may be used to access and/or modify other internal registers, for example the command and/or control registers. In some aspects, test modes accessible via the test register may be used to input or modify certain programming conditions of the flash memory 103 (e.g., read levels) to dynamically vary how data is read from the memory cells of the memory arrays 108. The registers 106 may also include one or more data latches coupled to the flash memory 103.

It should be understood that in all cases data may not always be the result of a command received from the host 104 and/or returned to the host 104. In some aspects, the controller 101 may be configured to execute a read operation independent of the host 104 (e.g., to verify read levels or BER). The predicate words "configured to," "operable to," and "programmed to" as used herein do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The controller 101 may perform the operations identified in blocks 302-306. The controller 101 may cause the operations identified in blocks 302-306 to occur, or the controller 101 may provide instructions to cause or facilitate the controller 107 (and the registers 106) to perform operations identified in blocks 302-306.

Figure 2A:
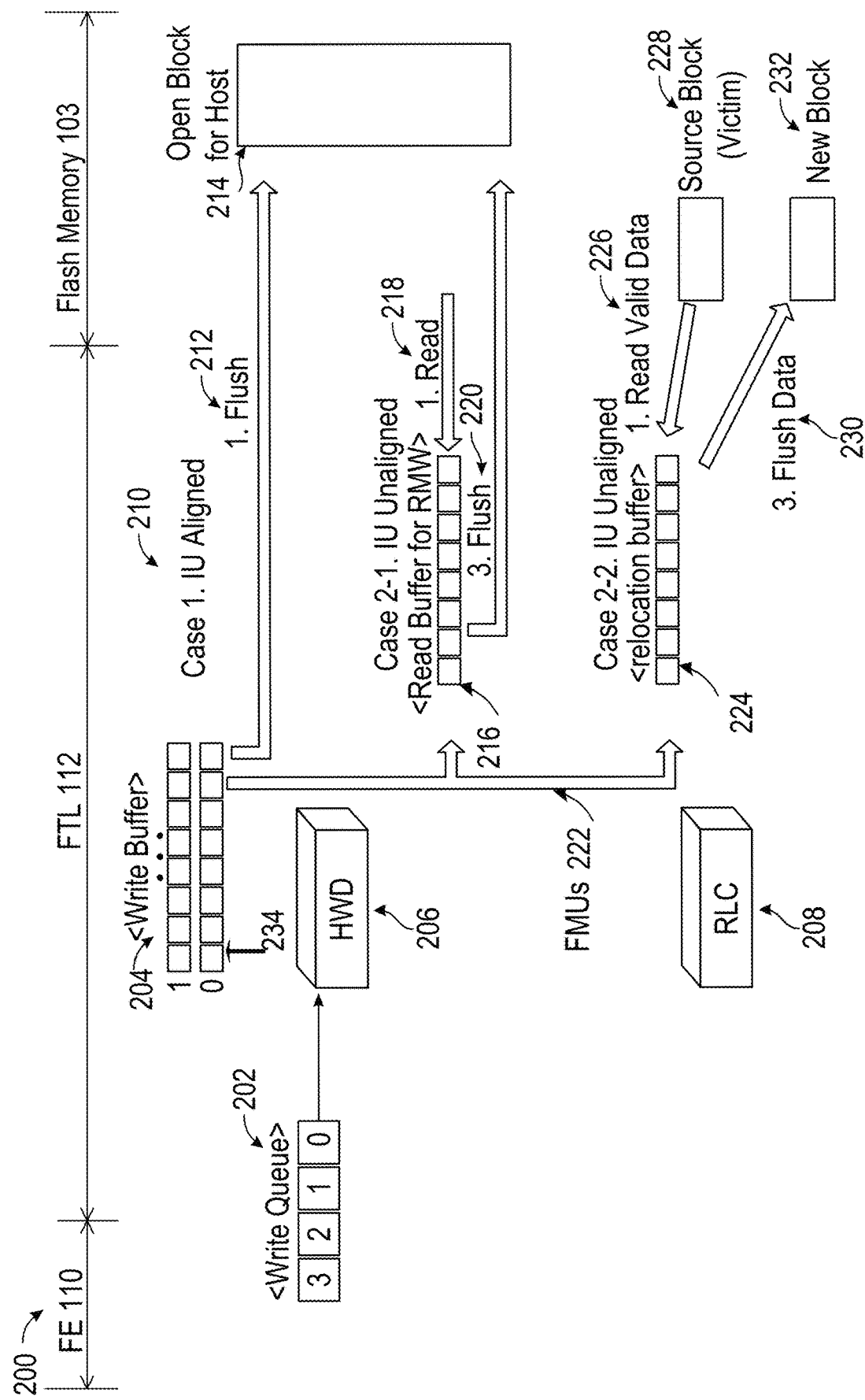
FIG. 2A is a schematic diagram of an example process for optimized read-modify-writes during relocation of overlapping logical blocks, according to one or more embodiments.

FIG. 2A illustrates an example system 200 for providing optimized read-modify-writes during relocation in a storage device (e.g., a data storage system 100), according to some embodiments. The system 200 may include a front-end 110, a flash translation layer (FTL) 112, and one or more flash memory 103. The controller 101 of FIG. 1 may include the front-end 110 and the FTL 112. Each of the one or more flash memory 103 may include a NAND 108. The front-end 110 may receive read or write requests. In FIG. 2A, a write queue 202 may queue write requests from the host 104 received via the interface 105. In some implementations, the write queue 202 acts as the interface between the front-end 110 and the FTL 112. In other words, the front-end 110 may receive the write requests from the host 104, and queue it to the write queue 202 for processing by the FTL 112. The front-end 110 may communicate with the host 104 to receive commands, parse commands, allocate write buffers, and/or receive host data. The FTL 112 may receive commands from the front-end 110, perform memory management (e.g., garbage collection, read scrub, wear leveling, etc.), translate logical address to physical address, manage dynamic RAM (DRAM) (local volatile memory) and manage the flash memory 103 (sometimes referred to as NAND), including overall operation of the SSD (or other non-volatile storage system). A physical storage (PS) 114 may communicate with NAND, perform error correction in read path, control interfaces to the flash, translate physical addresses to physical locations of NAND (e.g., physical channel, die, block, and/or page). The controller 107 may manage memory operations in the integrated memory assemblies/die of the flash memory 107 at the request of the FTL 112. For example, the controller 107 may carry out the read, erase and programming processes. Additionally, the controller 107 can perform buffer management, set specific voltage levels required by the FTL 112, perform error correction (ECC), control toggle mode interfaces to the flash memory 103, etc.

The front-end 110 may push a host write director (HWD) index into the write queue 202 when a buffer (e.g., a 32 KB buffer) is ready to be written. Each index may correspond to write information for a flash memory unit (FMU) 234; the size of an FMU may be, for example, 4 KB. In FIG. 2A, the write queue 202 shows indices 0, 1, 2, and 3, written to the write queue 202. A host write director (HWD) 206 receives and dequeues (or pops) an index from the write queue 202 and processes the write, using a write buffer 204. Each entry in the write buffer 204 may correspond to an FMU for an index (e.g., index 0, index 1).

Figure 2B:
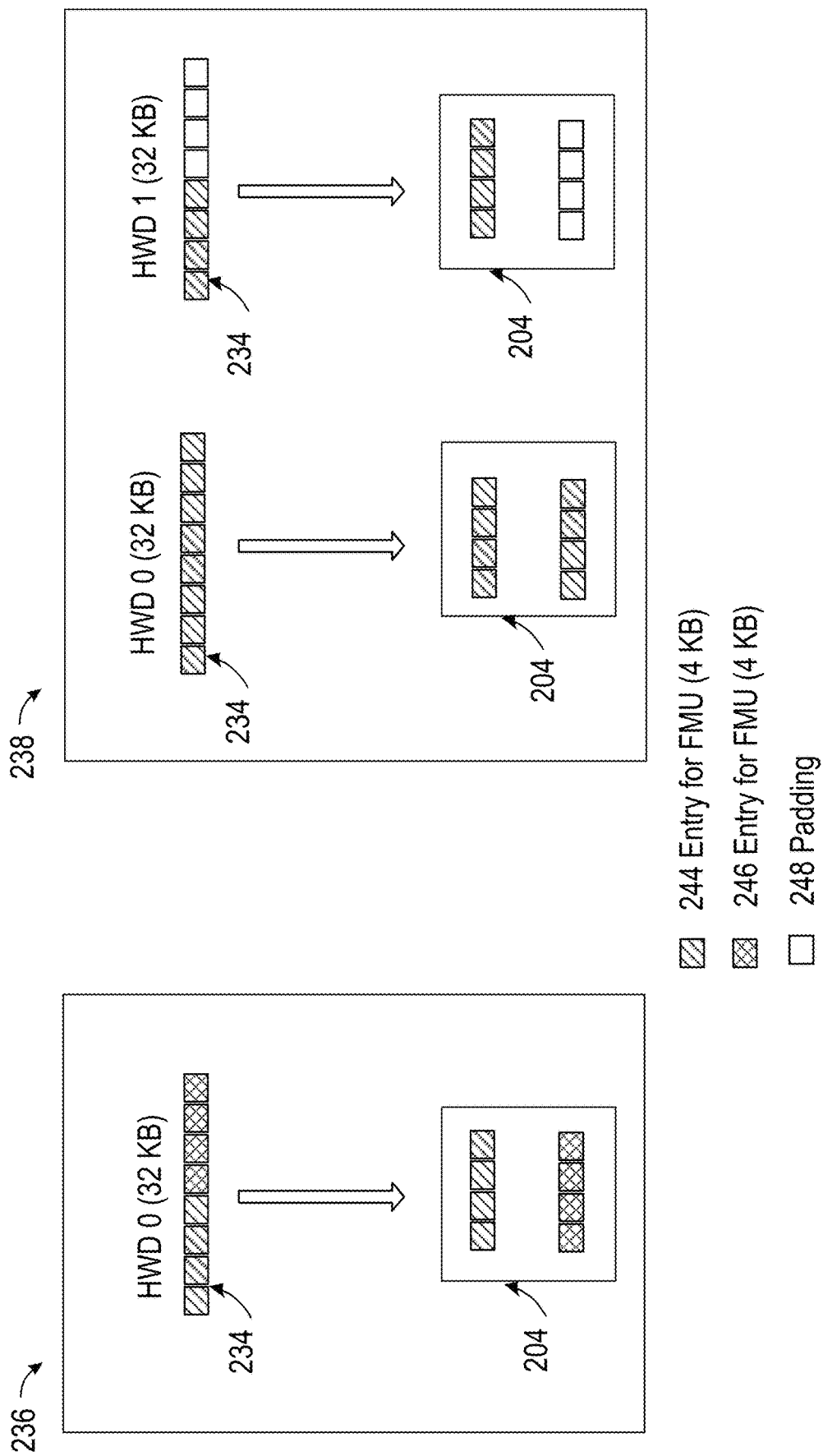
FIGS. 2B and 2C illustrate examples of aligned and unaligned writes.

FIG. 2B shows examples of aligned writes (case 1 in FIG. 2A). The size of each of HWD 0 and HWD 1 may be, for example, 32 KB. Shown on the left is a case 236 when a write sequence to HWD 0 includes two aligned writes, each of size 16 KB. The first set of four entries (each entry indicated by pattern 244) form a first write sequence written to an indirection unit 0 (IU 0), and the second set of four entries (each entry indicated by pattern 246) form a second write sequence written to an IU 1. On the right is another case 238 that includes two write sequences, the first one including a 32 KB aligned write to HWD 0 and another sequence that includes a 16 KB aligned write to HWD 1. For the write sequence to HWD 0, the FMUs are aligned so they are written without any padding. For the write sequence to HWD 1, this may require a padding 248 (only the first four FMUs are written from the host, and the others are padded, because the HWD is managed based on 32 KB due to HWD dependency).

Figure 2C:
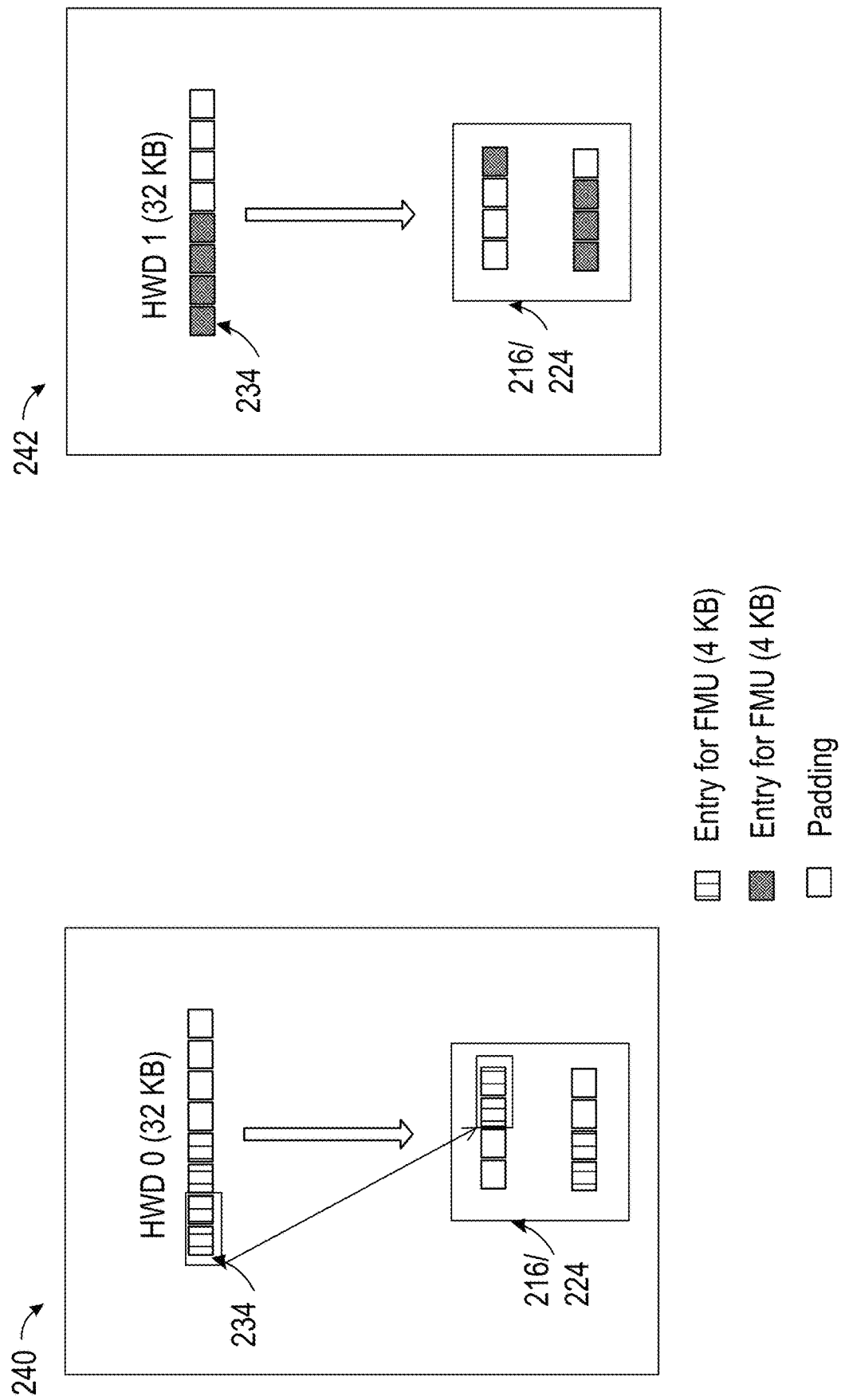

FIG. 2C shows examples of unaligned writes in the case of random writes. For example, in the case shown as 240, FMU's offset in IU is 2 for the first FMU, so the two FMUs are written to the third and fourth entries in a first RMW buffer 216 (or relocation buffer 224, for case 2-2 in FIG. 2A). In addition, the FMU's offset in IU is 0 for the third FMU, so the two following FMUs are written to the first and fourth entries in a second RMW buffer 216 (or relocation buffer 224, for case 2-2 in FIG. 2A). For the case shown as 242 on the right, suppose the write includes four FMUs (each FMU of size 4 KB) to HWD 1, and FMU's offset in IU for the second FMU is 0, then the first FMU is written as the last entry in the first RMW buffer 216 (or relocation buffer 224, for case 2-2 in FIG. 2A) (so 4 KB are written to the last entry in the 16 KB buffer), and the next three FMUs are written to the second RMW buffer 216 (or relocation buffer 224, for case 2-2 in FIG. 2A), for a total of 16 KB. In the case of unaligned writes, such as the examples shown in FIG. 2C, a HWD may be handled after the FTL 112 flushes 32 KB to an open block 214 of FIG. 2A, clears an overlap table, frees the HWD context. So, the unaligned writes may include costly operations in the controller, if handled separately.

Referring now back to FIG. 2A, to minimize such costly operations, when the HWD 206 pops an HWD index, if the index corresponds to an aligned IU, indicated as case 1 (IU aligned) 210, the HWD 206 flushes the write (or completes the write request) to an open block 214 in the flash memory 103, thereby writing data to the open block 214 for the host 104 (as indicated by step 212). On the other hand, if the IU is unaligned, one of the other two cases 2-1 or case 2-2, may be performed as follows. The controller 101 may check a relocation queue managed by a relocation module 208 (e.g., a relocation for GC or RS).

If the controller 101 (or the relocation module 208) determines that there is no block having an overlapped IU, then steps in 2-1 may be carried out. A read buffer 216 may be used to read data from the flash memory 103 (see step 218), valid FMUs from the host 104 (via the write buffer 204) may be copied (as indicated by step 222), and the resulting data may be flushed (or written) to the flash memory 103 (as indicated by step 220).

If the controller 101 (or the relocation module 208) determines that there is a block having an overlapped IU, then steps in 2-2 may be performed. The controller 101 may push the HWD index (e.g., from the write buffer 204) into a relocation buffer 224 (having, for example, a pending list), set a timer interrupt service routine (ISR), and trigger a handler (e.g., during a relocation event, such as for GC or RS). After a threshold time period, if the HWD index is not handled, the controller 101 may handle a read-modify-write operation as in case 2-1. For example, when the FTL 112 receives a HWD index that is unaligned and has overlapped IU with GC/RS block, the HWD index may be pushed into a pending list. After the threshold time period in a timer ISR, the controller 101 may check if there is any pending HWD index that is not handled over the threshold time period and the controller may trigger the steps in 2-1 for entries in the pending list. When relocation is performed, the relocation module 208 (e.g., for GC or RS) may check the relocation buffer 224 and handle RMW together with other relocations. For example, valid data may be read from a source block 228 in the flash memory (as indicated by step 226), valid FMUs may be copied from host (as indicated by step 222), and the resulting data may be flushed to a new block 232 in the flash memory (as indicated by step 230). Relocation is an internal operation that is performed to make free space or to move data to safe blocks. Relocation may include reading valid data from a source block and then writing the data to a new block. A controller, such as the controller 101, may perform RMW during relocation in case the relocation source block has the same IU with host writes, thereby avoiding extra cost for RMW. A controller may be sometimes referred to as firmware.

For garbage collection (GC), the controller 101 (or the relocation module 208) may find a source block or a victim block 228. Unlike RS, GC needs to find a source block to be migrated. GC may typically select a source block that has the least valid data. The controller 101 may apply the cost for RMW into the source blocks that has the same IU with the RMW when GC selects a source block. By doing this, the block that has same IUs with host writes can have a greater chance to be selected for GC. When GC finds a source block, the GC looks up host write commands in a host write queue 202. If the controller 101 finds a write command that includes unaligned data and has an overlapped IU with the source block, the controller may set the write command to be delayed so that it can be handled during GC. This RMW may be unset and handled if the delayed time is over a threshold time period. Some embodiments apply RMW cost to the source block. Some embodiments subtract the number of FMUs of the overlapped IUs from the valid count of the source block. For GC or RS, the controller 101 may perform RMW with a source block as follows: read data from flash (from the source block 228) (as indicated by step 226), check if there is any RMW that is overlapped with read data, merge host data into the read buffer (e.g., a relocation buffer 224) if they are overlapped (as indicated by step 222), and write the data in the read buffer to the flash memory 103 (as indicated by step 230).

Figure 3:
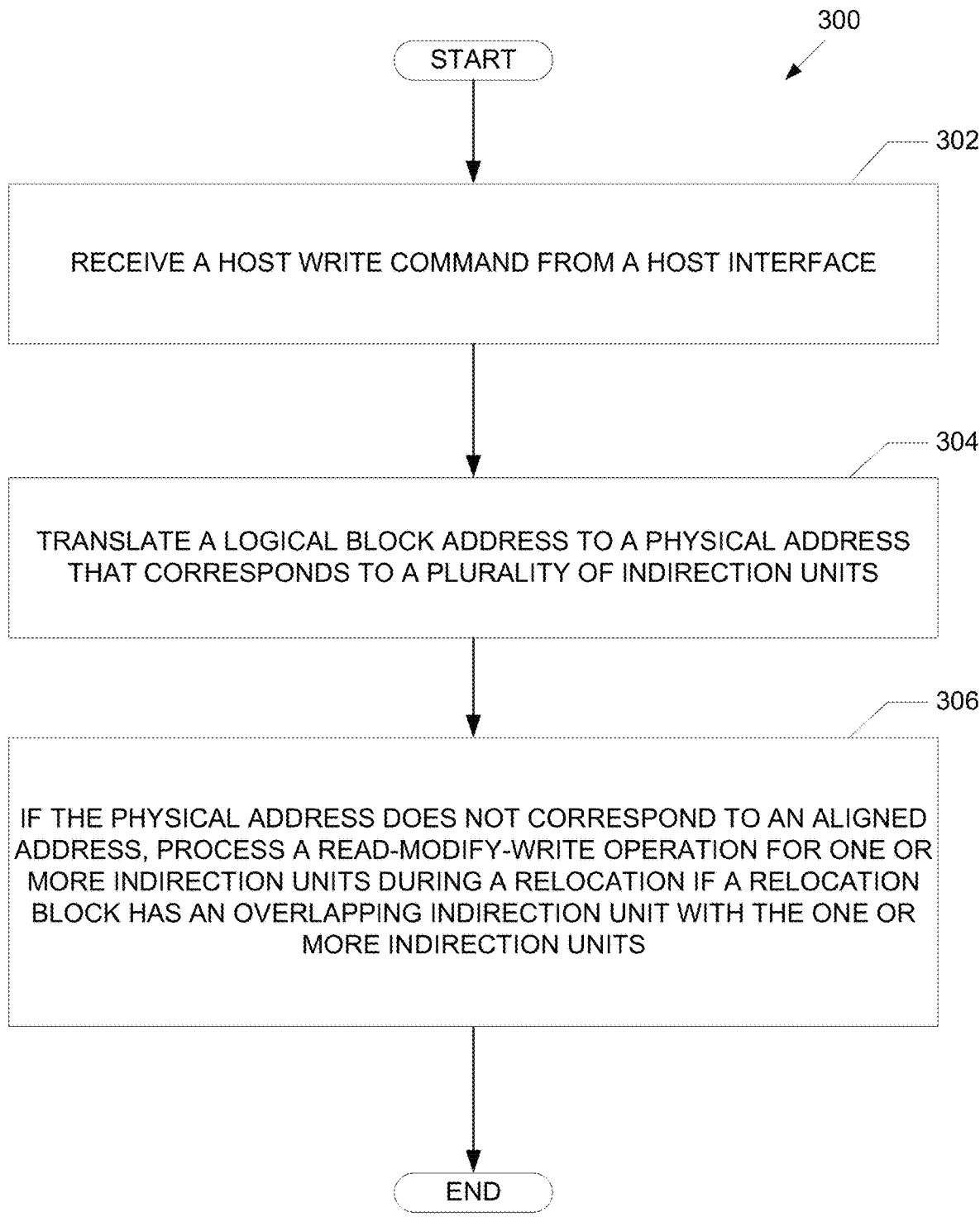
FIG. 3 is a flowchart illustrating an example process for optimized read-modify-writes during relocation of overlapping logical blocks, according to one or more embodiments.

It may be instructive to describe the structures shown in FIGS. 2A-2C with respect to FIG. 3, which is a flowchart illustrating an example process 300 for optimized read-modify-writes during relocation in a storage device, according to some embodiments. One or more blocks of FIG. 3 may be executed by a computing system (including, e.g., a controller 107 of a flash memory, a data storage controller 101 of a data storage system 100 or a solid-state storage device (SSD), a processor, or the like). Examples of a computing system or a controller may be the controller 101. Similarly, a non-transitory machine-readable medium may include machine-executable instructions thereon that, when executed by a computer or machine, perform the processes of FIG. 3. The steps of process 300 may be implemented as hardware, firmware, software, or a combination thereof.

In step 302, the controller 101 may receive a host write command from a host interface (e.g., the host interface 105). In step 304, the controller 101 may translate (e.g., using the flash translation layer 112) a logical block address for the host write command to a physical address on a device memory (e.g., the flash memory 103). The physical address may correspond to a plurality of indirection units.

In step 306, in accordance with a determination that the physical address does not correspond to an aligned address, the controller 101 may process a read-modify-write operation for one or more indirection units of the plurality of indirection units during a relocation (e.g., case 2-2 described above in reference to FIG. 2A), in accordance with a determination that a relocation block has an overlapping indirection unit with the one or more indirection units. The FTL 112 may manage a mapping table based on indirection units that may be used to translate logical addresses for indirection units to physical addresses. In this way, the controller 101 may determine that a relocation block has an overlapping indirection unit with the one or more indirection units.

The relocation may correspond to a garbage collection for migrating blocks to free space on the device memory. In that case, the controller 101 may select a source block (or victim block) to be migrated during the garbage collection based on whether the source block has an indirection unit that is the same as one of the plurality of indirection units. The controller 101 may subtract a number of minimal addressable units of memory of overlapped indirection units from a valid count of a source block during the garbage collection. The minimal addressable unit may be sometimes referred to as a flash management unit (FMU) which has, for example, 4 KB granularity and the data may be managed based on FMU. For example, suppose a block consists of 100 FMUs. When there are two closed blocks, say block 0 with 80 valid FMUs and block 1 with 60 valid FMUs, the controller 101 (which is performing GC) may select block 1 as a source (or victim). But if there are 30 FMUs of overlapped indirection units in block 0, block 0 has 50 (80-30) valid FMUs, so the block 0 may be selected as a source (or victim) in this case. Each block has a valid count for GC, in the FMU, to show how many valid data the block has. The controller 101 may, in accordance with a determination that the host write command includes unaligned data and has an overlapping indirection unit with a source block (or victim block), set the host write command to be delayed to allow the host write command to be handled during the garbage collection. For example, in FIG. 2A, the FTL 112 may receive a HWD index from the write queue 202 and handle it in sequence. The FTL may use a data structure (e.g., a buffer) to delay the HWD indexes popped from the write queue 202. The controller 101 may, in accordance with a determination that a current time exceeds a time threshold (e.g., 3 seconds) for the host write command, perform the read-modify-write operation for the host write command before the garbage collection.

The relocation may correspond to a read scrub operation to be performed when unstable data is detected. In that case, the controller 101 may, upon a detection of the unstable data, migrate valid data of a block with the unstable data to a new block. The controller 101 may, while reading data from the device memory, in accordance with a determination that data corresponding to the read-modify-write operation overlaps with the read data, merge the data corresponding to the host write command with the read data and write the merged data to the device memory.

The controller 101 may, in accordance with a determination that the physical address corresponds to an aligned address, perform the read-modify-write operation corresponding to the host write command without waiting for a relocation.

Various examples of aspects of the disclosure are described below. These are provided as examples, and do not limit the subject technology.

One or more aspects of the subject technology provide a data storage device (e.g., the data storage system 100) that includes a host interface for coupling the data storage device to a host system, a device memory for handling write commands having a different write granularity than write commands received from the host system, and a controller. The controller may be configured to receive a host write command from the host interface. The controller may also be configured to translate a logical block address for the host write command to a physical address on the device memory. The physical address corresponds to a plurality of indirection units. The controller may also be configured to: in accordance with a determination that the physical address does not correspond to an aligned address, process a read-modify-write operation for one or more indirection units of the plurality of indirection units during a relocation, in accordance with a determination that a relocation block has an overlapping indirection unit with the one or more indirection units.

The relocation may correspond to a garbage collection for migrating blocks in order to free space on the device memory. The controller may be further configured to select a victim block to be migrated during the garbage collection based on whether the victim block has an indirection unit that is same as one of the plurality of indirection units. The controller may be further configured to: subtract a number of minimal addressable units of memory of overlapped indirection units from a valid count of a victim block during the garbage collection. The controller may be further configured to: in accordance with a determination that the host write command includes unaligned data and has an overlapping indirection unit with a victim block, set the host write command to be delayed allowing the host write command to be handled during the garbage collection. The controller may be further configured to: in accordance with a determination that a current time exceeds a time threshold for the host write command, perform the read-modify-write operation for the host write command before the garbage collection.

The relocation may correspond to a read scrub operation to be performed when unstable data is detected. Upon a detection of the unstable data, valid data of a block with the unstable data may be migrated to a new block. The controller may be further configured to: while reading data from the device memory, in accordance with a determination that data corresponding to the read-modify-write operation overlaps with the read data, merge the data corresponding to the host write command with the read data and write the merged data to the device memory.

The relocation may correspond to a wear leveling operation that includes moving data in the relocation block to a different block of memory in the device memory that has reached a threshold erase count because of a recent erase operation. Wear leveling is an operation to equalize a program-erase counter (PEC) distribution of blocks to prevent early wear-out. Wear leveling may be triggered at a constant rate according to a PEC distribution of blocks and include relocation of a cold block (a block with a low PEC), a victim, to a hot free block (a block with a high PEC).

The controller may be further configured to: in accordance with a determination that the physical address corresponds to an aligned address, perform the read-modify-write operation corresponding to the host write command without waiting for a relocation.

In other aspects, a method is provided for optimized read-modify-writes during relocation. The method is implemented using one or more controllers for one or more storage devices. The method includes: receiving a host write command from a host interface; translating a logical block address for the host write command to a physical address on a device memory. The physical address corresponds to a plurality of indirection units; and, in accordance with a determination that the physical address does not correspond to an aligned address, processing a read-modify-write operation for one or more indirection units of the plurality of indirection units during a relocation, in accordance with a determination that a relocation block has an overlapping indirection unit with the one or more indirection units.

In further aspects, a system may include: means for receiving a host write command from a host interface; means for translating a logical block address for the host write command to a physical address on a device memory. The physical address corresponds to a plurality of indirection units; and means for, in accordance with a determination that the physical address does not correspond to an aligned address, processing a read-modify-write operation for one or more indirection units of the plurality of indirection units during a relocation, in accordance with a determination that a relocation block has an overlapping indirection unit with the one or more indirection units.

Various implementations of the methods and systems provide optimized read-modify-writes during relocation of overlapping logical blocks. The techniques described herein may be used to reduce solid state drive (SSD) random access memory (RAM) footprint, and provide performance advantages that improve the functioning of the storage device or SSD.

It is understood that other configurations of the subject technology will become readily apparent to those skilled in the art from the detailed description herein, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A data storage device, comprising:
   a host interface for coupling the data storage device to a host system;
   a device memory for handling write commands having a different write granularity than write commands received from the host system; and
   a controller configured to:
   receive a host write command from the host interface;
   translate a logical block address for the host write command to a physical address on the device memory, wherein the physical address corresponds to a plurality of indirection units; and
   in accordance with a determination that the physical address does not correspond to an aligned address, process a read-modify-write operation for one or more indirection units of the plurality of indirection units during a relocation, in accordance with a determination that a relocation block has an overlapping indirection unit with the one or more indirection units,
   wherein when the relocation corresponds to a garbage collection for migrating blocks in order to free space on the device memory, the controller is configured to perform one or more operations, and wherein the one or more operations comprise subtracting a number of minimal addressable units of memory of overlapped indirection units from a valid count of a victim block during the garbage collection.

2. The data storage device of claim 1, wherein the one or more operations comprise:
   selecting a victim block to be migrated during the garbage collection based on whether the victim block to be migrated has an indirection unit that is same as one of the plurality of indirection units.

3. The data storage device claim 1, wherein the one or more operations comprise:
   in accordance with a determination that the host write command includes unaligned data and has an overlapping indirection unit with a victim block, setting the host write command to be delayed to allow the host write command to be handled during the garbage collection.

4. The data storage device of claim 3, wherein the one or more operations comprise:
   in accordance with a determination that a current time exceeds a time threshold for the host write command, performing the read-modify-write operation for the host write command before the garbage collection.

5. The data storage device of claim 1, wherein when the relocation corresponds to a read scrub operation to be performed when unstable data is detected, the controller is configured to perform one or more further operations, and wherein the one or more further operations comprise: upon a detection of the unstable data, migrating valid data of a block with the unstable data to a new block.

6. The data storage device of claim 5, wherein the one or more further operations comprise:
while reading data from the device memory, in accordance with a determination that data corresponding to the read-modify-write operation overlaps with the read data, merging the data corresponding to the host write command with the read data and writing the merged data to the device memory.

7. The data storage device of claim 1, wherein when the relocation corresponds to a wear leveling operation, the wear leveling operation includes moving data in the relocation block to a different block of memory in the device memory that has reached a threshold erase count because of a recent erase operation.

8. The data storage device of claim 1, wherein the controller is further configured to:
in accordance with a determination that the physical address corresponds to an aligned address, perform the read-modify-write operation corresponding to the host write command without waiting for a relocation.

9. A method implemented using one or more controllers for one or more storage devices, the method comprising:
receiving a host write command from a host interface;
translating a logical block address for the host write command to a physical address on a device memory, wherein the physical address corresponds to a plurality of indirection units; and
in accordance with a determination that the physical address does not correspond to an aligned address, processing a read-modify-write operation for one or more indirection units of the plurality of indirection units during a relocation, in accordance with a determination that a relocation block has an overlapping indirection unit with the one or more indirection units,
wherein when the relocation corresponds to a garbage collection for migrating blocks in order to free space on the device memory, the method comprises performing one or more operations, and
wherein the one or more operations comprise:
in accordance with a determination that the host write command includes unaligned data and has an overlapping indirection unit with a victim block, setting the host write command to be delayed to allow the host write command to be handled during the garbage collection; and
in accordance with a determination that a current time exceeds a time threshold for the host write command, performing the read-modify-write operation for the host write command before the garbage collection.

10. The method of claim 9, wherein the one or more operations comprise:
selecting a victim block to be migrated during the garbage collection based on whether the victim block to be migrated has an indirection unit that is same as one of the plurality of indirection units.

11. The method of claim 9, wherein the one or more operations comprise:
subtracting a number of minimal addressable units of memory of overlapped indirection units from a valid count of a victim block during the garbage collection.

12. The method of claim 9, wherein when the relocation corresponds to a read scrub operation to be performed when unstable data is detected, the method comprises performing one or more further operations, and wherein the one or more further operations comprise:
upon a detection of the unstable data, migrating valid data of a block with the unstable data to a new block.

13. The method of claim 12, wherein the one or more further operations comprise:
while reading data from the device memory, in accordance with a determination that data corresponding to the read-modify-write operation overlaps with the read data, merging the data corresponding to the host write command with the read data and writing the merged data to the device memory.

14. The method of claim 9, further comprising:
in accordance with a determination that the physical address corresponds to an aligned address, performing the read-modify-write operation corresponding to the host write command without waiting for a relocation.

15. A system, comprising:
means for receiving a host write command from a host interface;
means for translating a logical block address for the host write command to a physical address on a device memory, wherein the physical address corresponds to a plurality of indirection units;
means for, in accordance with a determination that the physical address does not correspond to an aligned address, processing a read-modify-write operation for one or more indirection units of the plurality of indirection units during a relocation, in accordance with a determination that a relocation block has an overlapping indirection unit with the one or more indirection units; and
when the relocation corresponds to a read scrub operation to be performed when unstable data is detected,
upon a detection of the unstable data, means for migrating valid data of a block with the unstable data to a new block; and
while reading data from the device memory, in accordance with a determination that data corresponding to the read-modify-write operation overlaps with the read data, means for merging the data corresponding to the host write command with the read data and writing the merged data to the device memory.

* * * * *